United States Patent
Falk et al.

(10) Patent No.: US 6,580,716 B1
(45) Date of Patent: Jun. 17, 2003

(54) DISTRIBUTED ATM SWITCH AND METHOD FOR PERFORMING SWITCHING IN AN ATM NETWORK THAT INCLUDES A PROCESSING SATELLITE

(75) Inventors: Aaron D. Falk, Norwalk, CT (US); Michael W. Mann, Gilbert, AZ (US); Rhon L. Williams, Manhattan Beach, CA (US); David A. Wright, Solana Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/407,361

(22) Filed: Sep. 29, 1999

(51) Int. Cl.[7] .............................. H04L 12/28; H04L 1/00

(52) U.S. Cl. ....................... 370/396; 370/400; 370/325; 370/230; 370/235; 455/428

(58) Field of Search ........................... 370/310.1, 310.2, 370/316, 230, 235, 395.1, 396, 400, 319, 325, 323, 236, 237, 232, 233, 234; 455/427, 428, 430, 12.1

(56) References Cited

U.S. PATENT DOCUMENTS

| | | | | |
|---|---|---|---|---|
| 6,366,776 B1 | * | 4/2002 | Wright et al. | 455/12.1 |
| 6,377,561 B1 | * | 4/2002 | Black et al. | 370/330 |
| 2002/0054576 A1 | * | 5/2002 | Gobbi | 455/12.1 |

OTHER PUBLICATIONS

Priscoli et al., "Access and Switching Techniques in an ATM User–Oriented Satellite System", Proceedings of the 8th Annual Joint Conference of the IEEE Computer and Communications Societies. Technology: Emerging or Converging, INFOCOM '89, vol. 2, pp. 632–640, 1989.*

Pontano et al., "Processing and Non–Processing Satellite Architectures for Support of ATM Traffic", IEEE Military Communications Conference. Communications on the Move, MILCOM '93, vol. 1, pp. 242–246, Oct. 11–14, 1993.*

Voruganti et al., "Impact of Satellite Delay on Protocol Performance for ATM Traffic Over Non–Processing Satellites", IEEE Military Communications Conference, MILCOM '94, vol. 1, pp. 68–72, Oct. 2–5, 1994.*

Chellingsworth, "A Satellite Based ATM Switch", IEEE Colloquium on Networking Aspects of Small Terminal Satellite Systems, pp. Sep. 1–6, 1994.*

Mankarious, "A Full Mesh Asynchronous Transfer Mode (ATM) Satellite Communications Network", IEEE Military Communications Conference, MILCOM '95, vol. 1, pp. 11–15, Nov. 5–8, 1995.*

Chellingsworth, "CADENZA: The World's First ATM Switch in the Sky", 10th International Conference on Digital Satellite Communications, vol. 1, pp. 121–128, 1995.*

(List continued on next page.)

Primary Examiner—William Trost
Assistant Examiner—Rafael Perez-Gutierrez
(74) Attorney, Agent, or Firm—McAndrews, Held & Malloy, Ltd.

(57) ABSTRACT

The present invention relates to distributed ATM switches for use within an ATM network including processing satellite links. The functionality of the distributed ATM switch is preferably performed at three distinct locations. The first location is at a user earth terminal configured to perform at least one user plane function. The second location is at a network operations center configured to perform at least one control plane function. Finally, the remaining ATM switch functionality is performed within the payload of a processing satellite.

31 Claims, 2 Drawing Sheets

OTHER PUBLICATIONS

Verma, "Broadband via Satellite", IEEE Region 10 International Conference on Global Connectivity in Energy, Computer, Communication, and Control , TENCON '98, vol. 2, pp. 603–606, Dec. 17–19, 1998.*

Baiocchi et al., "Definition and Performance Analysis of a Simple, ABR–Like Congestion Control Scheme for Satellite ATM Networks With Guaranteed Loss Performance", IEEE Journal on Selected Areas in Communications, vol. 17, No. 2, pp. 303–313, Feb. 1999.*

Cuevas, "The Development of Performance and Availability Standards for Satellite ATM Networks", IEEE Communications Magazine, vol. 37, issue 7, pp. 74–79, Jul. 1999.*

Baiocchi et al., "An ATM–Like System Architecture for Satellite Communications Including On–Board Switching", International Journal of Satellite Communications, vol. 14, pp. 389–412, Oct., 1996.*

* cited by examiner

DISTRIBUTED ATM SWITCH AND METHOD FOR PERFORMING SWITCHING IN AN ATM NETWORK THAT INCLUDES A PROCESSING SATELLITE

BACKGROUND OF THE INVENTION

The present invention generally relates to switches for asynchronous transfer mode (ATM) networks. In particular, the present invention relates to distributed ATM switches for use within an ATM network including processing satellite links.

ATM networks may provide substantial performance increases over more traditional time division multiplexing (TDM) networks (also known as synchronous transfer mode or STM networks). This is especially true when the networks must carry many different types of information (e.g., data, voice, and video). Information travelling over an ATM network is coded into 53-byte cells. The first 5 bytes of each cell are the cell header and contain important information about the cell, including the routing information (i.e., destination address) for the cell.

In ATM, a transmission path (TP) is a set of physical connections that link the network. Virtual paths and virtual circuits are mappings laid over the TPs that control the flow of cells from sending terminals to receiving terminals. A virtual path represents a set of TPs assigned to carry cells that share higher-order address bits. Virtual paths contain one or more virtual circuits. A virtual circuit represents a set of TPs assigned to carry cells that share lower-order address bits. A virtual path may generally be thought of as a bundle of one or more virtual circuits. An assignment of a virtual path and a virtual circuit defines a virtual connection (VC) between any two network elements.

An important concept in ATM is that of the service contract. A service contract is an agreement between a user and the network that establishes certain parameters that the user will follow. For example, the contract may specify a certain average data rate the user is to maintain when sending data over the network. A service contract will also specify the quality of service (QoS) that the network will maintain with respect to the connection between any two user terminals. A QoS class defines parameters that represent a minimal level of network performance for the traffic carried by links that are designated as providing that particular QoS. Thus, for any two network elements within a network, there may need to be as many VCs set up between them as there are QoS classes defined for that network.

An ATM network may be envisioned as a sending user terminal, a receiving user terminal and an ATM cloud. The sending user terminal is connected to the cloud. The first switch through which the user terminal traffic passes after entering the cloud is said to serve as a user-network interface (UNI) with respect to that terminal. At a UNI, a function known as Usage Parameter Control (UPC) is performed. The UPC function ensures that the user terminal sending data into the ATM cloud is not exceeding the service parameters of its contract. For example, the UPC function determines whether or not a user terminal is sending data at a rate above the average bit rate established as set forth in its contract.

ATM switch functions are typically divided into user plane functions and control plane functions. User plane functions are those functions that control the movement of cells across the switch. A typical user plane function, for example, is the UPC function for established VCs. Control plane functions are typically those which relate to connection establishment and overall management of traffic flow. Some typical control plane functions include, for example, connection admission control (CAC) and routing (the selection of appropriate TPs for a particular VC).

As noted above, the UPC policing function ensures that a user terminal is not exceeding the usage requirements of the contract under which it was established. If the policing function determines that a user terminal is exceeding its allowed rate, then it checks to see if the guaranteed QoS can be met for all other contracts in existence. As long as the established QoS can be maintained for all contracts, the UNI may allow the additional traffic. However, if the established QoS for all other contracts can not be maintained, then the cells may be dropped. One problem with the occurrence of such a cell drop is that the user is often unaware that it has occurred unless the receiving end informs the user that something is wrong.

In terrestrial ATM networks, the policing function is performed by the ATM switch that is serving as the UNI for the sending user terminal. However, this can be problematic when the first switch within the cloud is a satellite based switch. First, it necessitates additional processing equipment on the satellite. This adds space, weight and additional power requirements to the satellite design. A second problem is additional inefficiency. The policing function may cause cells to be dropped at times. If that decision is made in the satellite, uplink bandwidth is used to transmit cells that will never reach the downlink. Waste of uplink bandwidth is a waste of a very precious system resource.

Another important user plane function provided by the user terminal is user equipment interface adaptation. An example of this adaptation is the protocol translation from Ethernet to ATM.

An important control plane function is call admission control. This function makes the determination as to whether or not a call can be admitted given the traffic currently present in the network. Ideally, it makes a real time determination as to the feasibility of accepting a new call, while maintaining the requirements of all contracts. Putting this functionally within a satellite payload is again problematic because of the additional size, weight and power requirements.

Another control plane function is that of bandwidth allocation. It is similar to call admission control but operates on a shorter time scale such as that of individual cells. The bandwidth allocation function may be implemented on the payload, in the network operation center, or a combination of both.

A need has long existed in the industry for a distributed ATM network switch that is suitable for use within ATM networks that include processing satellite links.

BRIEF SUMMARY OF THE INVENTION

It is an object of the present invention to provide a distributed ATM switch adapted to perform in an ATM network including processing satellite links.

Another object of the present invention is to provide an ATM switch that reduces the additional space, weight, and power requirements of ATM switch functionality in a satellite payload.

Yet another object of the present invention is to provide an ATM switch that conserves uplink bandwidth.

Still another object of the present invention is to provide an adaptive ATM switch for use in a network including processing satellite links.

One or more of the foregoing objects are met in whole or in part by a preferred embodiment of the present invention, which provides a distributed ATM switch. The functionality of the distributed ATM switch is preferably performed at three distinct locations. The first location is at a user earth terminal configured to perform at least one user plane function. The second location is at a network operations center configured to perform at least one control plane function. Finally, the remaining ATM switch functionality is performed within the payload of a processing satellite.

DETAILED DESCRIPTION OF THE INVENTION

Figure 1:
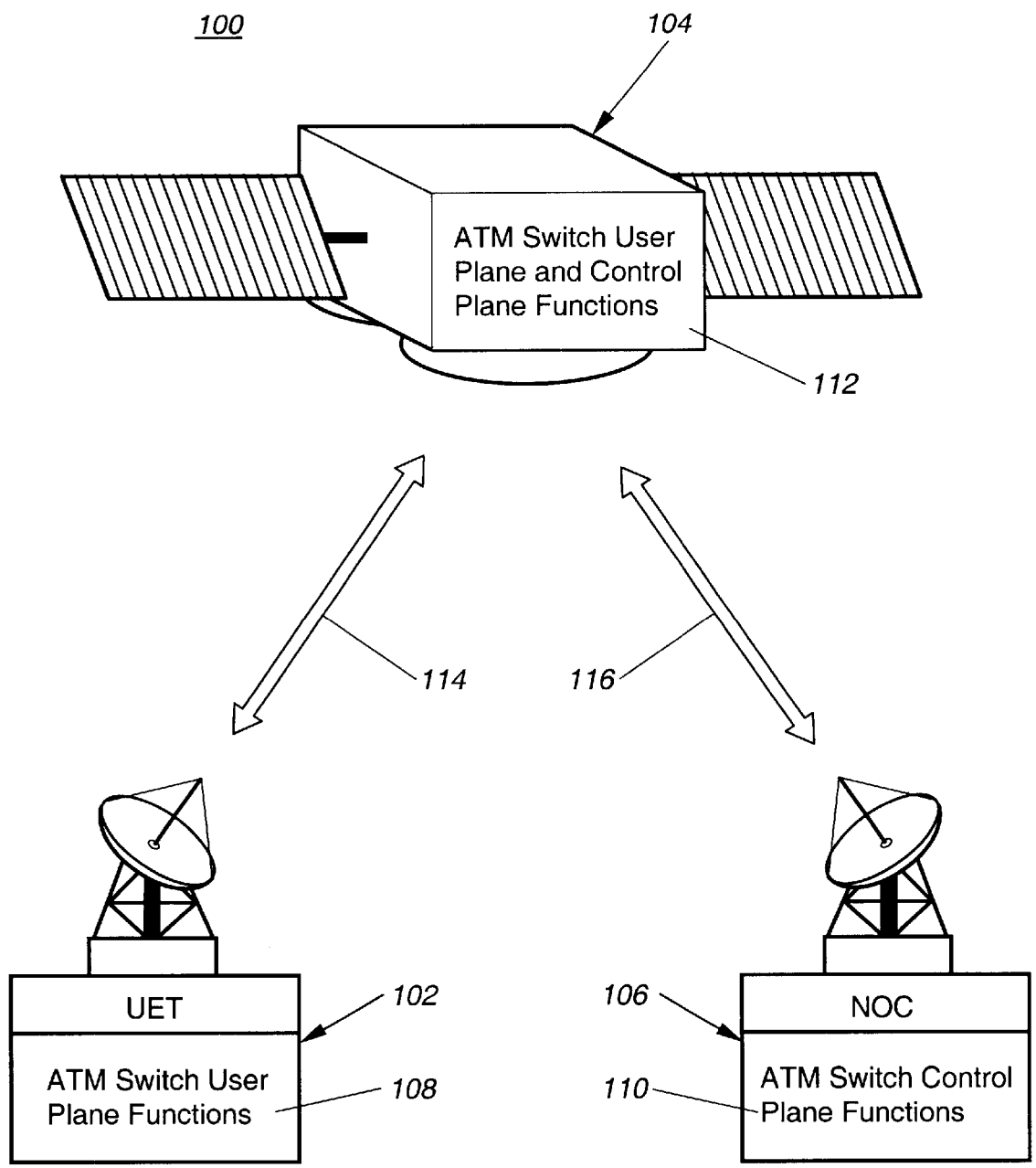
FIG. 1 illustrates a distributed ATM switch.

Turning now to FIG. 1, that figure illustrates an implementation of a distributed ATM switch within an ATM network 100. ATM network 100 includes user earth terminal (UET) 102, processing satellite 104 and network operations center (NOC) 106. FIG. 1 also shows three sets of ATM switch functions 108, 110 and 112. Also illustrated in FIG. 1 are communications links 114 and 116.

In a processing satellite ATM network, the UETs are end elements. The processing satellites, such as processing satellite 104, make up the ATM cloud. As discussed above, it is undesirable to perform all ATM switch functionality within the payload of the processing satellite 104.

A first set of ATM switch functions 108 are moved from the satellite 104 to the UET 108. The functions included in the first set 108 are preferably one or more user plane functions. The first set 108 may include, for example, the UPC function. In the present invention, the UPC function is preferably performed by the UET 102, resulting in several significant benefits. First, by taking responsibility of the UPC function away from the processing satellite 104, the payload of the processing satellite 104 may be made smaller and lighter, and will consume less power.

In addition, by moving the UPC function to the UET 102, the policing function may be performed before uplink transmission to the processing satellite. Waste of uplink bandwidth is thereby prevented. Because the policing function is performed at the UET 102, an additional benefit that arises is that when the policing function determines that a cell drop is necessary, the UET 102 may immediately be made aware of the drop. This UET 102 may then take any necessary corrective action. The remainder of the user plane functions may be left onboard the processing satellite 104.

A second set of ATM switch functions 110 are moved from the satellite 104 to the NOC 106. The functions included in the second set 110 are preferably one or more user control functions. The second set 110 may preferably consist of the majority of the control plane functions. However, control plane functions regarding the maintenance of address tables are preferably accomplished by the payload of the processing satellite 104, as these functions are preferably performed quickly with respect to the actual switching of cells (which still occurs on the satellite 104). The remaining control plane functions are preferably contained in the second set 110 and are placed within the NOC 106. For example, the second set may include the CAC function.

A third set of ATM switch functions 112 are left on the satellite 104. The functions included in the third set 112 are preferably one or more user control functions and one or more control plane function. It is preferable that the number of control plane functions in the third set 112 be minimal. For example, the third set 112 may only contain one control plane function that relates to the maintenance of address tables. Since most user plane functions deal with the actual switching of cells, the third set 112 may contain the majority of the user plane functions, as the actual switching of cells will occur on the satellite 104.

While the above discussion associates particular classes and numbers of ATM functions into each of the sets of ATM functions 108, 110 and 112, it is not necessary for this to be the case. Any of the sets 108, 110 and 112 may contain only user plane functions, only control plane functions, or both. Furthermore, each of the sets 108, 110 and 112 may contain any number of functions. Indeed, it is permissible for one of the sets to be empty (i.e., contain no functions).

The distribution of the ATM switch functionality over various network components means that some information is sent between the three elements (the UET 102, the processing satellite 104 and the NOC 106) to coordinate the switching function. To accomplish this communication, communications links 114 and 116 are set up between the UET and the satellite and between the NOC and the satellite, respectively. The communications links 114 and 116 may be permanent VCs (PVCs) dedicated to carrying the ATM switch coordination information. These PVCs may carry switch coordination information between the various components of the distributed ATM switch using ATM control cells.

For example, UPC setup information is sent from the satellite 104 to the UET 102 over the communications link 114. The NOC 106 will send information to the processing satellite 104 by way of communications link 116 to set up the routing tables that are maintained onboard the processing satellite 104. Using communications link 116, the processing satellite 104 will send information to the NOC 106 to report system performance metrics, including queue status and cell loss rate.

One clear advantage of moving many control plane functions away from the processing satellite 104 is that the control plane functions are more likely to change as communications protocols evolve. By leaving only the functions that are more likely to remain static onboard the processing satellite 104, the distributed ATM switch may be much more easily adapted to future protocol changes.

Figure 2:
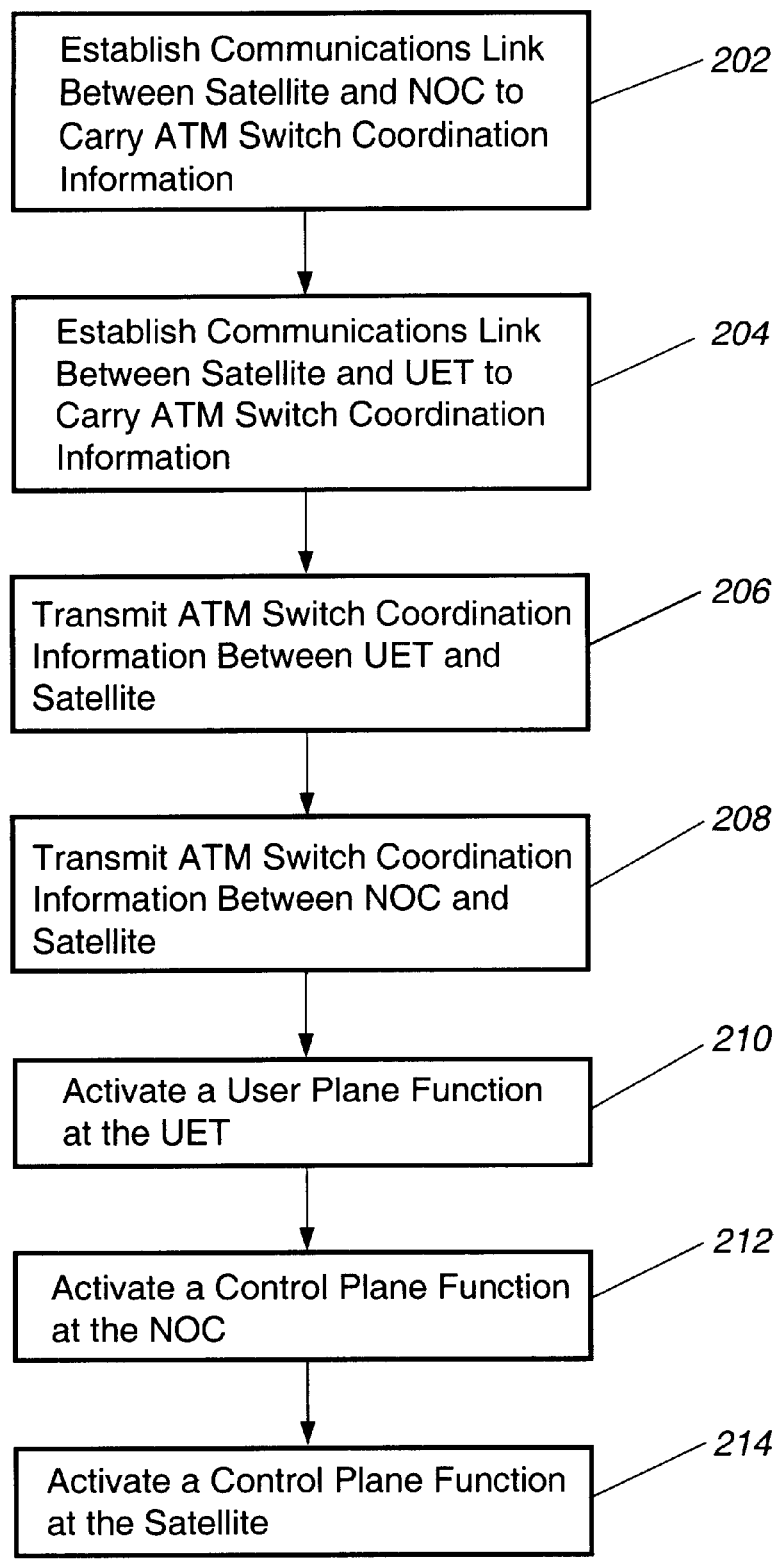
FIG. 2 illustrates a flowchart of a method for implementing a distributed ATM switch.

Turning to FIG. 2, the figure illustrates a flowchart 200 of a method for implementing a distributed ATM switch. The flowchart includes an establish a satellite to NOC communications link step 202, an establish a satellite to UET communications link step 204, a transmit switch coordination information between UET and satellite step 206, a transmit switch coordination information between NOC and satellite step 208, an activate user plane function at UET step 210, an activate control plane function at NOC step 212, and an activate control plane function at satellite step 214.

At the establish a satellite to NOC communications link step 202, a communications link is established between the NOC and the satellite for the purposes of carrying ATM switch coordination information between the NOC and the satellite. The communications link may be a permanent virtual connection dedicated to the transmission of the switch coordination information.

At the establish a satellite to UET communications link step 204, a communications link is established between the UET and the satellite for the purposes of carrying ATM switch coordination information between the UET and the satellite. The communications link may be a permanent virtual connection dedicated to the transmission of the switch coordination information.

At the transmit switch coordination information between UET and satellite step 206, ATM switch coordination is transmitted between the UET and the satellite over the link established at step 204.

At the transmit switch coordination information between NOC and satellite step 208, ATM switch coordination is transmitted between the NOC and the satellite over the link established at step 202.

At the activate user plane function at UET step 210, one or more user plane functions of the ATM switch is executed at the UET. This function may be, for example, a UPC function.

At, the activate control plane function at NOC step 212, one or more control plane functions of the ATM switch is executed at the NOC. This function may be, for example, a CAC function.

At the activate control plane function at satellite step 214, one or more control plane functions of the ATM switch is executed at the satellite. This function may be, for example, an address table maintenance function.

While the flowchart 200 shows the steps 202–214 occurring in a specific order, it is not necessary for the steps 202–214 to be executed in this order. Furthermore, any of the steps 206–214 may be executed simultaneously with each other.

The present invention overcomes many limitations of past ATM switches as used in ATM networks comprising processing satellites. By distributing the ATM switch functionality between the satellite and ground components, the present invention provides savings in satellite space, weight, and power requirements. By performing the policing function before uplink transmission from the UET, uplink bandwidth is conserved. Furthermore, the present invention provides a more easily adaptable ATM switch.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features that come within the spirit and scope of the invention.

What is claimed is:

1. A distributed ATM switch comprising in combination:
   a user earth terminal configured to perform a user plane function of an ATM switch, the user plane function including policing of ATM cells at the user earth terminal, wherein an ATM cell provides policing information;
   a network operations center configured to perform a control plane function of the ATM switch; and
   a processing satellite configured to perform at least one control plane function of the ATM switch.

2. The distributed ATM switch of claim 1, further comprising:
   a first communications link between the network operations center and the satellite for carrying switch coordination information for the distributed ATM switch; and
   a second communications link between the user earth terminal and the satellite for carrying switch coordination information for the distributed ATM switch.

3. The distributed ATM switch of claim 2, wherein the first and second communications links are virtual connections dedicated to the switch coordination information.

4. The distributed ATM switch of claim 1, wherein the network operations center control plane function is a call admission control function.

5. The distributed ATM switch of claim 1, wherein the satellite control plane function is an address table maintenance function.

6. The distributed ATM switch of claim 1, wherein the user plane function is a usage parameter control policing function.

7. The distributed ATM switch of claim 1, wherein the user plane function is a user equipment interface adaptation.

8. The distributed ATM switch of claim 1, wherein the control plane function is a bandwidth allocation.

9. A method for performing switching in an ATM network, the method comprising:
   activating a user plane function of an ATM switch at a user earth terminal, the user plane function including policing of ATM cells at the user earth terminal, wherein an ATM cell provides policing information;
   activating a control plane function of the ATM switch at a network operations center;
   activating a control plane function of the ATM switch at a processing satellite.

10. The method of claim 9, further comprising the step of:
    establishing a first communications link between the network operations center and the satellite;
    establishing a second communications link between the user earth terminal and the satellite; and
    transmitting ATM switch coordinate information over the first and second communications links.

11. The method of claim 9, wherein the step of activating a control plane function at the processing satellite comprises activating an address table maintenance function.

12. The method of claim 9, wherein the step of activating a control plane function at a network operations center comprises activating a call admission control function.

13. The method of claim 9 wherein the step of activating a control plane function at a network operations center comprises activating a bandwidth allocation control function.

14. The method of claim 9, wherein the step of activating a user plane function comprises activating a user equipment interface adaptation.

15. The method of claim 9, wherein the step of activating a user plane function comprises activating a policing user plane function.

16. The method of claim 15, wherein the step of activating a policing user plane function comprises activating a usage parameter control function.

17. A distributed ATM switch comprising in combination:
   a user earth terminal configured to perform a first set of functions of an ATM switch, the first set of functions including policing ATM cells based on ATM cell usage information;
   a network operations center configured to perform a second set of functions of the ATM switch; and
   a processing satellite configured to perform a third set of functions of the ATM switch.

18. The distributed ATM switch of claim 17, further comprising:
   a first communications link between the network operations center and the satellite for carrying switch coordination information for the distributed ATM switch; and a second communications link between the user earth terminal and the satellite for carrying switch coordination information for the distrbuted ATM switch.

19. The distributed ATM switch of claim 18, wherein the first and second communications links are virtual connections dedicated to the switch coordination information.

20. The distributed ATM switch of claim 17, wherein the second set of functions includes a control plane function.

21. The distributed ATM switch of claim 20, wherein the control plane function is a bandwidth allocation control function.

22. The distributed ATM switch of claim 20, wherein the control plane function is a call admission control function.

23. The distributed ATM switch of claim 17, wherein the third set of functions includes a control plane function.

24. The distributed ATM switch of claim 23, wherein the control plane function is a address table maintenance function.

25. The distributed ATM switch of claim 17, wherein the first set of functions includes a user plane function.

26. The distributed ATM switch of claim 25, wherein the user plane function is a user equipment interface adaptation.

27. The distributed ATM switch of claim 25, wherein the user plane function is a policing user plane function.

28. A method for distributed ATM switching in an ATM network including processing satellite links, the method comprising:

policing ATM cell traffic using a user earth terminal;

maintaining an ATM cell address table at a satellite; and controlling connection admission using a network operations center.

29. The method of claim 28, further comprising transmitting ATM switch coordination information between the user earth terminal, the satellite, and the network operations center.

30. The method of claim 28, wherein the policing step occurs before uplink transmission of the ATM cell traffic from the user earth terminal to the satellite.

31. The method of claim 28, further comprising determining a cell drop at the user earth terminal.

* * * * *